United States Patent
Silakov et al.

(10) Patent No.: US 12,493,537 B2
(45) Date of Patent: Dec. 9, 2025

(54) SYSTEM AND METHOD FOR BOOTING SERVERS IN A DISTRIBUTED STORAGE TO IMPROVE FAULT TOLERANCE

(71) Applicant: Virtuozzo International GmbH, Schaffhausen (CH)

(72) Inventors: Denis Silakov, Moscow (RU); Pavel Emelyanov, Moscow (RU); Alexey Kobets, Seattle, WA (US)

(73) Assignee: Virtuozzo International GmbH, Schaffhausen (CH)

( * ) Notice: Subject to any disclaimer, the term of this patent is extended or adjusted under 35 U.S.C. 154(b) by 138 days.

(21) Appl. No.: 17/862,768

(22) Filed: Jul. 12, 2022

(65) Prior Publication Data

US 2022/0350716 A1    Nov. 3, 2022

Related U.S. Application Data (63) Continuation of application No. 16/234,940, filed on Dec. 28, 2018, now Pat. No. 11,385,981.

(51) Int. Cl.
| | |
|---|---|
| *G06F 11/20* | (2006.01) |
| *G06F 8/61* | (2018.01) |
| *G06F 9/4401* | (2018.01) |
| *G06F 13/16* | (2006.01) |
| *G06F 13/42* | (2006.01) |
| *H04L 67/1097* | (2022.01) |

(52) U.S. Cl.
CPC ........ *G06F 11/2094* (2013.01); *G06F 9/4408* (2013.01); *G06F 9/4411* (2013.01); *G06F 13/1668* (2013.01); *G06F 13/4221* (2013.01); *H04L 67/1097* (2013.01); *G06F 8/61* (2013.01); *G06F 2201/815* (2013.01); *G06F 2213/0036* (2013.01)

(58) Field of Classification Search
CPC .. G06F 11/2094; G06F 9/4408; G06F 9/4411; G06F 13/1668; G06F 13/4221; G06F 8/61; G06F 2201/815; G06F 2213/0036; G06F 11/2097; H04L 67/1097
See application file for complete search history.

(56) References Cited

U.S. PATENT DOCUMENTS

| | | | |
|---|---|---|---|
| 6,701,332 B1 * | 3/2004 | Vella | G06F 11/1435 |
| 2004/0083357 A1 * | 4/2004 | Duncan | G06F 9/4406 |
| | | | 713/2 |

(Continued)

*Primary Examiner* — Andrew C Georgandellis
(74) *Attorney, Agent, or Firm* — ArentFox Schiff LLP; Michael Fainberg (57) ABSTRACT

Disclosed herein are systems and method for booting servers in a distributed storage to improve fault tolerance. In one aspect, an exemplary method comprises, during a booting of a hardware server belonging to the distributed storage, starting a boot component from on any one physical block device from at least two or more physical block devices of the hardware server, wherein the at least two or more physical block devices of the hardware server are bootable and each physical block device stores the boot component, wherein an Operating System (OS) of the hardware server is installed on a virtual disk, and wherein the virtual disk is stored on the distributed storage, and by the boot component, accessing the distributed storage to obtain access to the virtual disk, mounting the virtual disk as a root file system of the OS, and booting the OS from the mounted virtual disk.

20 Claims, 5 Drawing Sheets

(56) References Cited

U.S. PATENT DOCUMENTS

2004/0243650 A1* 12/2004 McCrory .............. G06F 9/5061
707/999.203
2014/0372744 A1* 12/2014 Xu ........................ G06F 9/4416
713/2
2017/0249156 A1* 8/2017 Frey ........................ G06F 9/441

* cited by examiner

SYSTEM AND METHOD FOR BOOTING SERVERS IN A DISTRIBUTED STORAGE TO IMPROVE FAULT TOLERANCE

CROSS-REFERENCE TO RELATED APPLICATIONS

This application is a continuation of U.S. application Ser. No. 16/234,940, filed on Dec. 28, 2018, which is hereby incorporated by reference in its entirety.

TECHNICAL FIELD

The present disclosure is generally related to the field of fault tolerance of servers, more specifically to systems and methods for booting servers in a distributed storage to improve fault tolerance.

BACKGROUND

Modern distributed storage systems often involve cloud storage. The term "cloud storage" is used when storage is provided using multiple physical servers, e.g., a cluster of physical servers, for storing data in a distributed manner. A cloud storage (i.e., a cloud based storage system) often provides features for fault tolerance, data replication, backup, etc. For example, if a specific physical storage disk in a server fails, data stored on the failed disk is not lost due to replicas of the data being stored on other disks on the same or other servers.

From the perspective of a user, the cloud storage looks and operates like a network File System (FS). For example, the cloud storage may be mounted to a folder just like other file systems.

Typically, a server that participates in a cluster has a large number of disks and may be used for storing any type of data uploaded to the storage. For instance, standard off-the-shelf physical servers may be used for instantiating software defined network components, e.g., computation, storage and networking components.

A server that participates in a cluster also has a system disk, i.e., a unique specific disk. The Operating System (OS) used for booting (e.g., booting of the server) and starting necessary services is installed in the system disk. The OS runs services for disk and data management, data replication, and so on. Thus, the system disk is needed for numerous critical operations. However, the system disk may fail during run time or after being powered off. When the system disk fails, the server cannot be booted and disks containing data that are still alive become unavailable until the server is restarted. Effectively, the entire server can no longer participate in the cluster. For scenarios in which the server has a large number of disks, the severity of the problem may affect the entire cluster. For example, other servers in the cluster may have to be overloaded, e.g., services may have to be moved to disks on other servers.

One approach to restore after a system disk failure is to store a system disk backup, replace the failed system disk by a new disk, restore from the backup on the new disk, and run the services again. Another approach is to install a new disk (i.e., replacing the failed disk), reinstall the OS on the new disk, and reregister existing chunk services. The reregistering may be facilitated via a smart installer that recognizes existing cluster components on a server and reregisters the recognized cluster components. However, these approaches are inconvenient and costly in terms of server downtime, storage for backup system disks, and development of a smart installer. In addition, synchronization between the operational and backup system disks is needed.

Given the criticality of the system disk, there is a need for improving the fault tolerance of the server.

SUMMARY

Accordingly, a system and method is provided for booting servers in a distributed storage to improve fault tolerance.

In one aspect, the system comprises a computing device comprising a processor, and any number of servers of the distributed storage, each server including at least one physical block device, at least two or more of the physical block devices of a hardware server being bootable, each physical block device of the at least two or more physical block devices storing a boot component, an Operating System (OS) of the hardware server being installed on a virtual disk, the virtual disk being stored on the distributed storage, the processor configured to: during a booting of a hardware server belonging to the distributed storage, start a boot component from on any one physical block device from at least two or more physical block devices of the hardware server; and by the boot component, access the distributed storage to obtain access to the virtual disk, mount the virtual disk as a root file system of the OS, and boot the OS from the mounted virtual disk.

In one aspect, the method for booting servers in a distributed storage to improve fault tolerance comprises: during a booting of a hardware server belonging to the distributed storage, starting a boot component from on any one physical block device from at least two or more physical block devices of the hardware server, wherein the at least two or more physical block devices of the hardware server are bootable and each physical block device of the at least two or more physical block devices stores the boot component, wherein an Operating System (OS) of the hardware server is installed on a virtual disk, and wherein the virtual disk is stored on the distributed storage, and by the boot component, accessing the distributed storage to obtain access to the virtual disk, mounting the virtual disk as a root file system of the OS, and booting the OS from the mounted virtual disk.

In one aspect, the OS is responsible for an operation of the server as a part of the distributed storage.

In one aspect, the OS is configured to perform at least one of: serving requests sent to the distributed storage, and running storage services including one of: metadata services, chunk services, data replication services and backup services.

In one aspect, the OS is responsible for an operation of the server as a part of the distributed storage and the OS is configured to perform at least one of: serving requests sent to the distributed storage, and running storage services including one of: metadata services, chunk services, data replication services and backup services.

In one aspect, the OS, as a part of the distributed storage, handles tasks associated with the virtual disk on which the OS is installed, the tasks including at least synchronizing replicas of the virtual disk.

In one aspect, the virtual disk of the OS installed on the hardware server is stored on the distributed storage, and at least one replica of the virtual disk of the OS is stored on the hardware server.

In one aspect, the at least two or more physical block devices of the hardware server store data of the distributed storage; and wherein each physical block device of the at least two block devices contains a first part for storing the boot component and a second part for storing data in accordance to operations of the distributed storage.

In one aspect, the boot component further performs at least one of: initializing hardware needed to start the OS, loading drivers needed to connect to the distributed storage and to work with the virtual disk, loading an image of the virtual disk of the OS from the distributed storage onto a Random Access Memory (RAM) or to a partition on any number of physical block devices, delegating control to the OS initialization process in a mounted image file.

In one aspect, the boot component accesses the virtual disk on the distributed storage using an Internet Small Computer Systems Interface (i SC SI) storage networking standard.

In one aspect, the virtual disk is a loop back block device or a raw disk image.

In one aspect, the boot component comprises an OS kernel, an OS loader and an initial root file system bound to the OS kernel.

In one aspect, the present disclosure describes a non-transitory computer readable medium storing thereon computer executable instructions for booting servers in a distributed storage to improve fault tolerance, including instructions for: during a booting of a hardware server belonging to the distributed storage, starting a boot component from on any one physical block device from at least two or more physical block devices of the hardware server, wherein the at least two or more physical block devices of the hardware server are bootable and each physical block device of the at least two or more physical block devices stores the boot component, wherein an Operating System (OS) of the hardware server is installed on a virtual disk, and wherein the virtual disk is stored on the distributed storage, and by the boot component, accessing the distributed storage to obtain access to the virtual disk, mounting the virtual disk as a root file system of the OS, and booting the OS from the mounted virtual disk.

The above summary of example aspects serves to provide an understanding of the teachings of the present disclosure. This summary is not an extensive overview of all contemplated aspects, and is intended to neither identify key or critical elements of all aspects nor delineate the scope of any or all aspects of the disclosure. Its sole purpose is to present one or more aspects in a concise form as a prelude to the more detailed description of the disclosure that follows. To the accomplishment of the foregoing, the one or more aspects of the methods and systems of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Various exemplary aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a description of one or more exemplary aspects in order to provide a basic understanding of the disclosed system and method. This description is not an extensive overview of all contemplated aspects, and is not intended to identify key or critical elements of all aspects nor delineate the scope of any or all aspects.

The exemplary aspects are described in the context of a system, method and computer program product for improving fault tolerance of servers by having an Operating System (OS) on a virtual disk hosted on a distributed storage (e.g., a cluster)—instead of on a specific physical disk of the server.

In order to add clarity, some terms and phrases used in describing aspects of the present disclosure are defined below:

A "distributed storage" refers to a storage made up of several storages.

Virtual disk is a software component that emulates an actual disk, such as an optical disc drive, a floppy disk drive, or a hard disk drive. To other programs, a virtual disk looks and behaves like an actual physical device. A virtual disk may be in any of the following forms: Disk image, a computer file that contains the exact data structure of an actual storage device; Logical disk (also known as vdisk), an array of two or more actual drives that cooperatively act like a single device; and a RAM disk, which stores its data in random-access memory (RAM) instead of on a storage device.

A loop device, vnd (vnode disk), or lofi (loop file interface) is a pseudo-device that makes a file accessible as a block device. The loop device is a block device that maps its data blocks not to a physical device such as a hard disk or optical disk drive, but to the blocks of a regular file in a file system or to another block device. This can be useful for example to provide a block device for a file system image stored in a file, so that it can be mounted with the mount command.

Ploop is a disk loopback block device, not unlike loop but with many features like dynamic resize, snapshots, backups etc. The main idea is to put container file system in a file.

OS loader refers to a boot loader.

Raw image refers to an image containing all disk data—an exact copy of drive's surface stored in one or set of files. It includes used as well unused clusters and sectors.

The root directory is the first or top-most directory in a hierarchy. It can be likened to the trunk of a tree, as the starting point where all branches originate from. The root file system is the file system contained on the same disk partition on which the root directory is located; it is the file system on top of which all other file systems are mounted as the system boots up.

An init root file system refers to an Initial RAM disk.

The teachings of the present disclosure may be practiced in conjunction with any type of operating systems. As such, most of the above terms are applicable for all types of operating systems, including Windows and Linux operating systems. In some cases, e.g., "ploop" is used in limited types of operating systems. It is noted that any other image formats may also be used for purposes of the present disclosure.

Returning to the teachings of the present disclosure, the server of the present disclosure belongs to the distributed storage. For ease of understanding, exemplary aspects are described below for a distributed storage while operating on file storages. However, the system and method of the present disclosure may be applied to block storages or object storages. For instance, the block storage may be used for storing data corresponding to an OS image.

Figure 1:
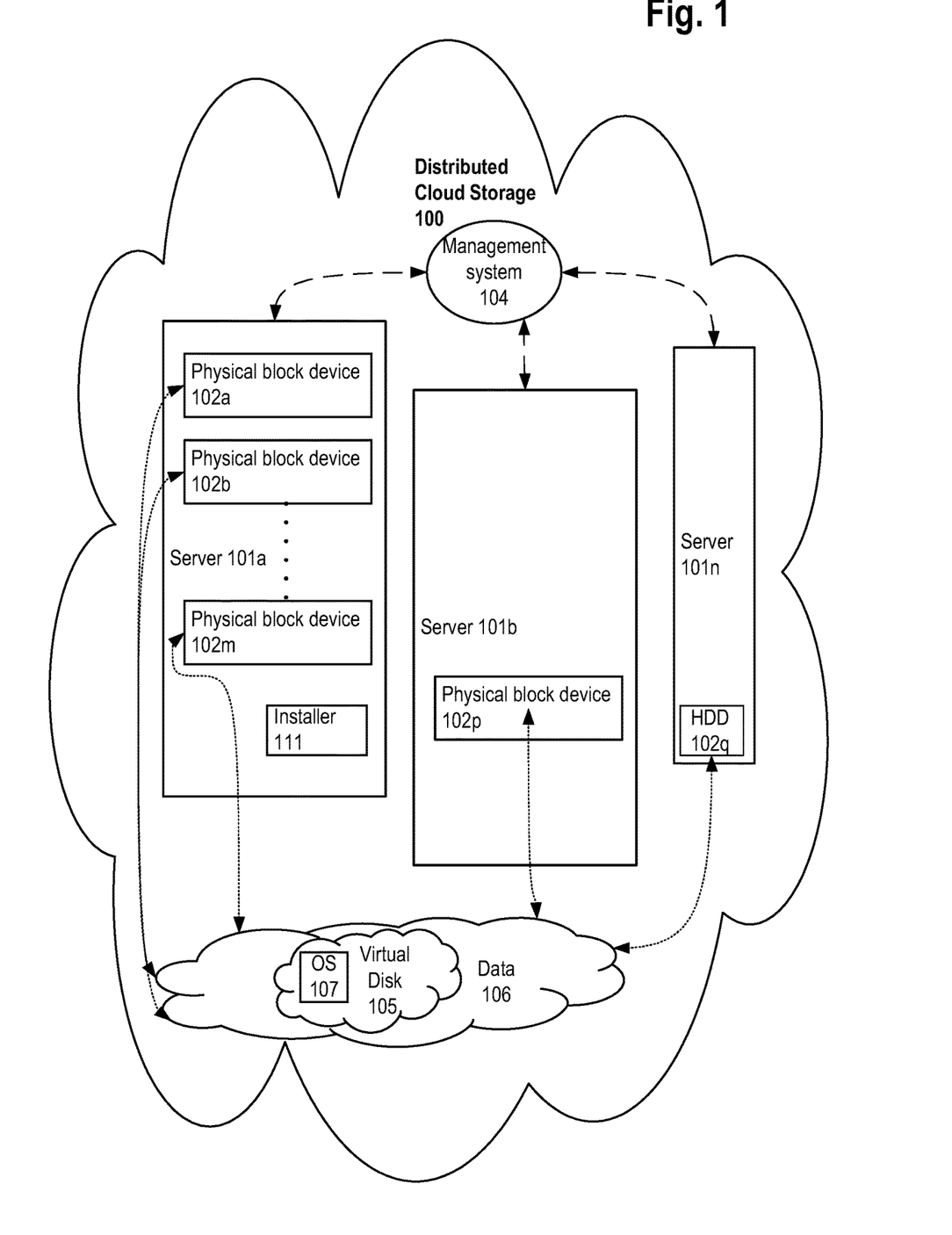
FIG. 1 is a block diagram illustrating a system for improving the fault tolerance of servers using a distributed cloud storage.

FIG. 1 is a block diagram illustrating a system for improving the fault tolerance of servers in a distributed cloud storage using the facilities of the distributed cloud storage 100. The distributed cloud storage 100 includes a plurality of hardware servers 101a, 101b, ..., 101n. The distributed cloud storage 100 is managed by a management system 104 deployed across the plurality of servers 101a, 101b, ..., 101n.

Figure 5:
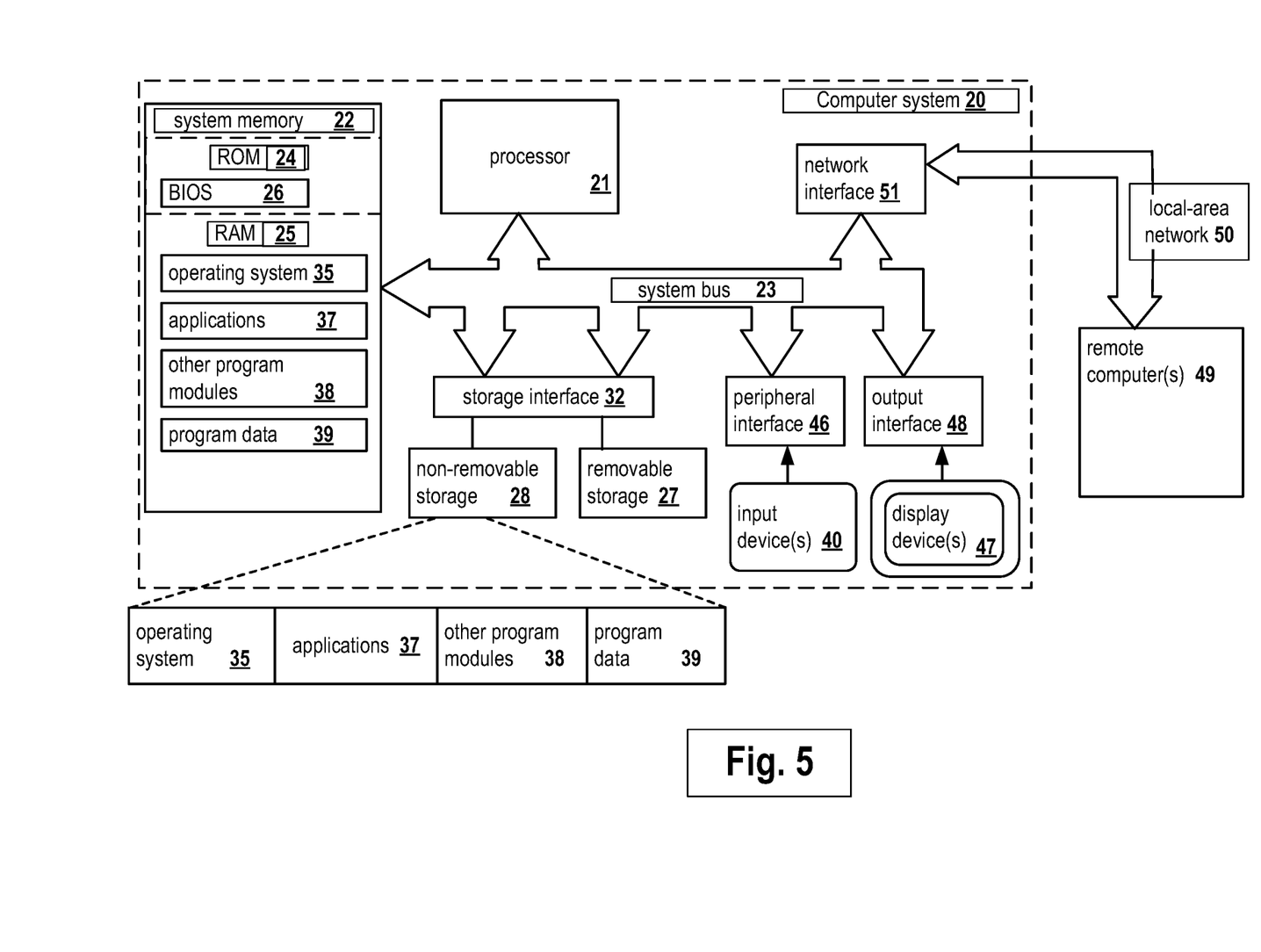
FIG. 5 is a block diagram illustrating a general-purpose computer system on which aspects of the present disclosure may be implemented in accordance with an exemplary aspect.

A server of the plurality of servers 101a, 101b, ..., 101n may comprise any number of physical components (e.g., as shown in FIG. 5). For clarity, only physical components used to illustrate the teachings of the present disclosure are shown in FIG. 1. In other words, a server of the plurality of servers 101a, 101b, ..., 101n comprises a number of physical components, e.g., processors, physical block devices (e.g., Hard Disk Drives (HDDs), Solid State Drives (SSDs), flash drives, SMR disks, etc.) or memory (e.g., Random Access Memory (RAM)), I/O interface components, etc. However, only physical block devices are shown in FIG. 1. For example of FIG. 1, server 101a includes physical block devices 102a, 102b, ... 102m, server 101b includes physical block device 102p, and server 101n includes physical block device 102q. The physical servers 101a, 101b, ..., 101n can be used for storing any type of data uploaded to storage, e.g., for storing user data, data of applications, data of Virtual Machines (VM), data of Containers (CT), whole file systems, small files, etc. Furthermore, the storage may contain VM disk images, CT images, root file systems, etc. The storage can be a part of a hyperconvergence platform. In general, the distributed cloud storage 100 may include any number of computing devices (e.g., a personal computers, laptops, servers, etc.) that include a computer processing unit ("CPU") and electronic memory that includes software for performing a boot of a server. In one example, an installer for implementing the method of the present disclosure may be provided in a selected server of the plurality of servers. For example, in FIG. 1, an installer 111 is provided in server 101a. The installer 111 is configured to install software (e.g., Operating System (OS)).

In one aspect, the OS 107 of a server is installed on a virtual disk 105 that is hosted on distributed storage; i.e., is part of data stored on hardware servers (e.g., servers 101a, 101b, ..., 101n) that belong to distributed storage. In one aspect, the virtual disk 105 is a loop back block device or a raw disk image. In one aspect, the virtual disk may be a disk of another standard format. The creation of the virtual disk may be accomplished in one of the following two ways. The first way is to create a virtual disk (e.g., plop), mount the created virtual disk (e.g., on a physical block device in a hardware server), and install OS on the mounted virtual disk as if the virtual disk is the same as a physical disk. The second way is to install an OS on a physical block device and create a raw disk image of the physical block device on which the OS is installed. The OS image is the virtual disk with the installed OS. That is, the OS image comprises a file containing image of installed OS (i.e., the files needed for OS execution).

Figure 2:
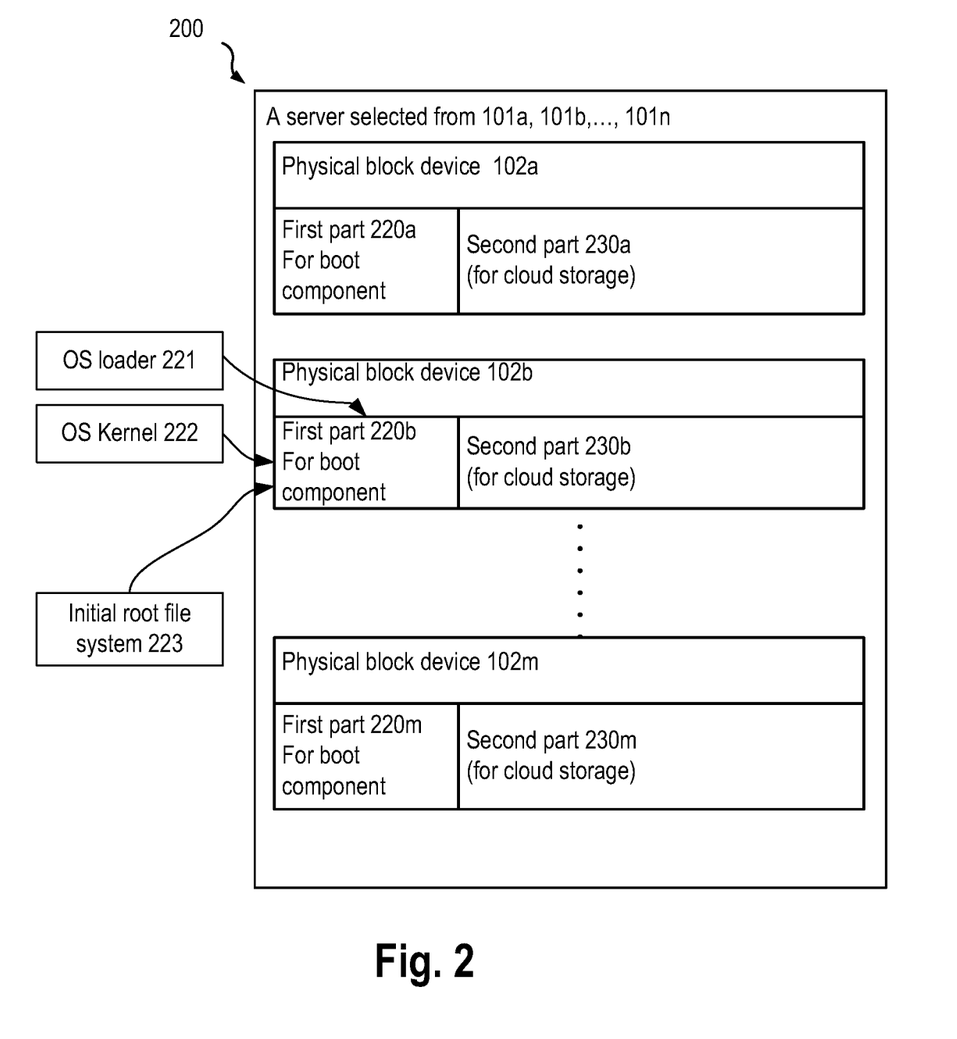
FIG. 2 is an exemplary block diagram that illustrates a partitioning of a plurality of physical block devices of the server in accordance with the present disclosure.

For example, the OS 107 may be distributed across the plurality of physical block devices, e.g., as shown in FIG. 2. In one aspect, a server is selected from the servers 101a, 101b, ..., 101n. The selected server is the server on which the OS will run. Then, at least one replica of the virtual disk 105 is stored on the selected server, i.e., on the selected server from among servers 101a, 101b, ..., or 101n. In one aspect, the OS is configured to perform at least one of: serving request sent to the distributed cloud storage 100, and running storage services, e.g., metadata services (MDS), chunk services (CS), data replication services, deduplication, journaling, encryption/decryption, and backup services. Also, the OS is responsible for interaction with hardware (e.g., it contains drivers, e.g. for network interface controller). The MDS handles/maintains and updates storage metadata, e.g., which and where data chunks are stored, which clients can access the data chunks (on read/write), etc. The CS service is responsible for storing data chunks and providing data to clients. CS may also be responsible for data replication (also called for data redundancy).

In one aspect, the OS, as part of the distributed cloud storage 100, handles tasks associated with the virtual disk 105 on which the OS is installed, the tasks including at least synchronizing replicas of the virtual disk 105.

Data 106 is data stored in distributed storage. The data is stored distributed across any number of physical block devices 102a, 102b, ..., 102m, 102p, and 102q. The virtual disk 105 is part on the data 106. Therefore, the virtual disk 105, including the OS 107, is stored on the distributed cloud storage 100, as shown in FIG. 1. In one aspect, at least one replica of the virtual disk 105 is stored on the hardware server 101a, 101b, or 101n.

Then, the hardware server 101a, 101b, or 101n is configured so that at least some of the physical block devices of the hardware servers 101a, 101b, or 101n are bootable. For example, for the hardware server 101a, at least some of the physical block devices 102a, 102b, ..., 102m are configured to be bootable. For example, the at least some of the physical block devices may include two or more physical block devices of the server. Similarly, for the hardware server 101b, the physical block device 102p is configured to be bootable, and for the hardware server 101c, the physical block device 102q is configured to be bootable. In other words, the boot component is placed on some physical block devices of some of the hardware servers. The configuration of some of the hardware servers 101a, 101b, or 101n comprises putting on some respective physical block devices of the hardware server a boot component. In some aspects, a predefined number of physical block devices include the boot component and the remaining physical block devices do not include the boot component. The criteria for determining which physical block devices and how many physical block devices include the boot component may be based on characteristics of the physical block devices, e.g., newer, larger, smaller, and the like.

The operations of the present disclosure may be performed with any number of servers. In some aspects, the operations of the present disclosure are performed for all servers belonging to the storage. In other aspects, the operations of the present disclosure are performed only for a pre-determined number of servers belonging to the distributed storage. In some aspects, OSs of each server can be put on the distributed storage. In some aspects, several servers (i.e., a plurality of servers) use one OS image. In some aspects, each server uses a respective unique OS image (i.e., its own image). In some aspects, the determination as to whether several servers use a same OS image or each server has its own image is based on the hardware of the servers.

Once the hardware server 101a, 101b, or 101n is configured (e.g., BIOS is configured), the boot component on any one physical block device of the plurality of physical block devices is configured. For example, after the hardware server 101a is configured, the boot component on a physical block device 102a, 102b, . . . , or 102m may be configured. The configuration of the boot component enables the boot component to connect to the distributed cloud storage 100 and to access the virtual disk 105 on the distributed cloud storage 100. In one aspect, the boot component is able to work with the virtual disk 105 and read the virtual disk 105.

In one aspect, the configuration of the boot component also includes enabling the boot component to perform (during a booting of the hardware server) at least one of: mounting the virtual disk 105 as a root file system of the OS, mounting the virtual disk 105 to one of physical block devices of the hardware server or to memory, and booting the OS from the mounted virtual disk 105.

In one aspect, the boot component accesses the virtual disk 105 on the distributed cloud storage 100 using an Internet Small Computer Systems Interface (iSCSI) storage networking standard.

In one aspect, the configuration of the boot component further comprises at least one of: initializing hardware needed to start the OS, loading drivers needed to connect to the distributed cloud storage 100 and to work with the virtual disk, loading an image of the virtual disk of the OS from the distributed cloud storage 100 onto a Random Access Memory (RAM) or to a partition on any number of physical block devices 102a, 102b, . . . , 102m, 102p, 102q, delegate control to the OS initialization process in a mounted image file (i.e., to the mounted virtual disk 105 of the OS to perform the booting).

FIG. 2 is an exemplary block diagram 200 that illustrates a partitioning of a plurality of physical block devices of the server in accordance with the present disclosure. Each physical block device 102a, 102b, . . . , 102m of the server 101a comprises two parts: a first part for storing the boot component and a second part for storing data in accordance with operations of the distributed cloud storage 100. For example, physical block device 102a comprises a first part 220a used for storing the boot component and a second part 230a used for storing the data. Similarly, physical block device 102b comprises a first part 220b used for storing the boot component and a second part 230b used for storing the data, and physical block device 102m comprises a first part 220m used for storing the boot component and a second part 230m used for storing the data. In other words, the second part is used for storing data in accordance with the server's participation in a cluster.

In one aspect, the boot component comprises an OS kernel, an OS loader and an initial root file system bound to the OS kernel ("bound" means that initial root file system is created to be compatible to the OS kernel), and any additional parts used when a server is being booted. For example, in FIG. 2, the boot component stored in 220b includes the OS kernel, 222, the OS loader 221 and the initial root file system 223 bound to the OS kernel 222. For clarity, a brief description of the boot component is provided below.

A brief summary of features of the OS loader, kernel and initial file system, as used in the present disclosure, is provided below. The additional parts may or may not be included in the OS image.

When a server is being booted, the basic input/output system (BIOS) of the server checks parameters in order to identify the physical block device to be used for booting. Once the physical block device to be used for booting is identified, the server searches for the boot component on the identified physical block device. The boot component is then found and launched. For example, in one aspect, an OS loader included in the boot component is found and launched. In one aspect, a part of boot component (e.g., OS loader) is located in the master boot record (MBR) of every configured physical block device. Therefore, if a given physical block device is used for booting, the basic input/output system launches that part (e.g., OS loader) of a boot component from the MBR of the given physical block device.

The boot component, when launched, loads all necessary parts for booting the server. For example, the OS loader, as part of the boot component, may be launched. The OS loader, which is included in the boot component, knows the locations of the kernel and the initial root file system on a physical block device. Then, the OS loader may load the OS kernel and/or initial root file system.

The boot component also has parameters of the virtual disk from which the server is to be booted. For example, the OS loader contained in the boot component may forward parameters of the virtual disk to the kernel and/or the initial root file system. The parameters may include some of: the storage cluster name, IP address(es) of the server(s) storing OS image (or parts of OS image), and credentials (login/password), the OS image name, and so on. In one aspect, one or more of the parameters may be hardcoded into the boot component during configurations. In one aspect, some of the parameters may be provided by a user during a boot. For example, the boot component may request the user to provide some of the parameters needed for booting the server. It is noted that the boot component may not contain all of the parts described above. For example, it may not be necessary to include all of the OS loader, kernel and the initial file system. For instance, if a special kernel and loader for connecting to storage and mounting is created, the initial file system may not be needed in the boot component. In other aspects, additional parts needed for starting one or more other processes may also be included in the boot component.

In some aspects, the kernel is an OS kernel that comprises a single atomic binary file and has all the drivers necessary for: booting, physical initialization of all server drives, running a process that starts all other OS processes. In one aspect, the OS kernel comprises a file containing a code, and the code while running (i.e., executing the code), runs (i.e., executes the code) in a processor privileged mode. In one aspect, based on the received parameters (described above), the physical initialization of drives of the server is performed and all other OS processes are started. For example, the OS loader may forward the physical parameters to the kernel and/or initial root file system and the kernel may boot and perform physical initializations of drives of the server, and run the initialization process to start all other OS processes.

The boot component, also includes a portion for accessing storage, e.g., the distributed cloud storage. For example, the boot component may include an initial root file system that includes a part or a component that accesses storage, e.g., distributed cloud storage 100, loads required files (i.e., the image of the OS file system), mounts the image. So boot component delegates control to the OS inside the mounted image by launching the initialization process. In one aspect, the delegating of control to the OS inside the mounted image may involve a reboot. For example, a cluster micro-client may be placed in the boot component, e.g., in the initial root file system, that will access the cluster and retrieve the required OS image. It is noted that, in order to perform the operations of the boot component (e.g., its initial root file system part) in accordance with the teachings of the present disclosure, the boot component may contain a storage client and a utility for mounting virtual disks. In other words, the boot component is tasked with mounting the storage cluster corresponding to the parameters described above, retrieving the virtual disk from the mounted storage cluster, mounting the retrieved virtual disk locally, and booting the OS of the server from the locally mounted virtual disk.

As described above, the boot component is a component responsible for booting the server, connecting to distributed cloud storage 100, loading an OS image (including the FS of OS) from the distributed cloud storage 100, and booting the OS and all required services from the loaded OS image. In one aspect, the kernel and the initial root file system of the boot component launch the system of the server, load the OS image, mount the file system, and boot the OS. By making the boot component available on a plurality of physical block devices, the fault tolerance of the server is improved.

It is noted that the initial root file system needs to access storage but does not need to have all the services that are in storage. For example, it may not need access to disk management and backup services. It is also noted that the space requirements on disks are not the same for all parts of the boot components. The kernel needs several MB of space in memory, whereas the rest of the OS requires several GB of space. However, the size ratio depends on a type of installation. A minimal or base installation that only allows running the storage service requires several hundred MBs.

When the OS is hosted on the distributed storage, the updating of the boot component is easier; The updating of the boot component includes updating only one OS image, and having the distributed storage synchronize the changes and keep the OS images consistent throughout the distributed storage. Moreover, when the OS is hosted on the distributed storage, resource efficiencies (e.g., CPU and RAM usage) are gained. For instance, for scenarios in which maintenance of several system disks on one server would have been needed while using standard approaches, the method of the present disclosure would update the boot component on every physical block device if necessary. Moreover, only the some parts of boot component (e.g., loader and kernel) are updated on every physical block device. It is also noted that the boot component may be updated on every configured physical block device when necessary. The updating of the boot component in accordance with the teachings of the present disclosure is relatively safe because the loader and kernel are small and their health may readily be verified. Moreover, the loader and kernel are updated only on one physical block device and then the updated loader and kernel are copied to other physical block devices. Note that only one copy of the boot component is used at a given time. The remaining copies exist to ensure high availability of the server.

In some aspects, it is noted that the OS is installed not on a physical disk, but in a ploop hosted on storage. Non-storage disks store only the kernel and initial root file system configured to choose the right ploop and boot the system from the chosen ploop. In addition, it is also noted that not all physical block devices on hardware servers belong to the distributed storage. Some may not contain storage data, but may nevertheless contain boot component and may be configured to be loadable.

Figure 3:
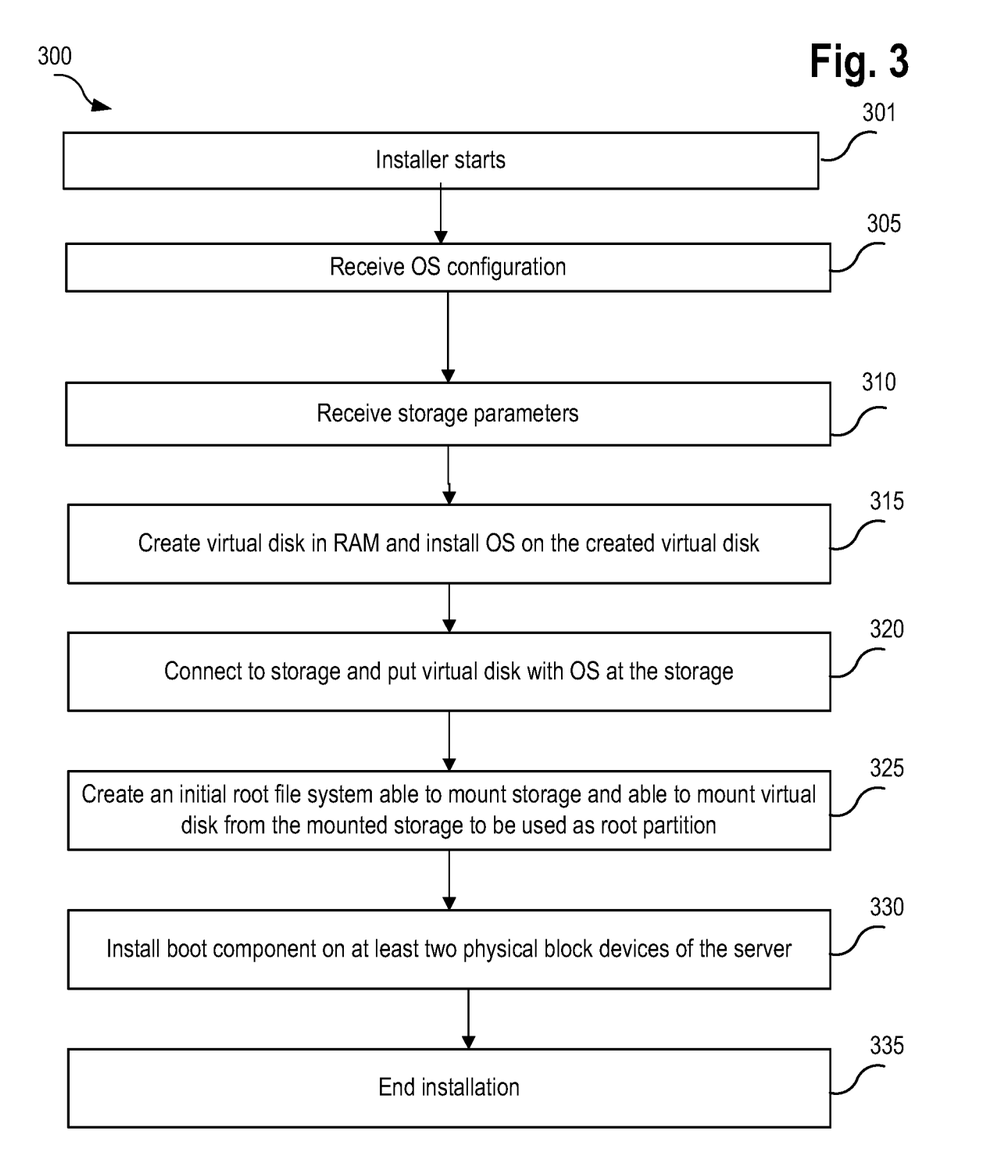
FIG. 3 illustrates an exemplary block diagram of an installation process for a fault tolerant server in accordance with the teachings of the present disclosure.

FIG. 3 illustrates an exemplary block diagram of an installation process 300 for a fault tolerant server 101a, 101b, or 101n in accordance with the teachings of the present disclosure. For example, the installation may be performed by an installer, e.g., installer 111 of FIG. 1.

In step 301, the installer 111 starts the installation process.

In step 305, the installer 111 receives an OS configuration for the server. For example, a user enters the OS configuration of the server. In one aspect, the entered OS configuration includes a root password, an Internet Protocol (IP) address, hostname, etc.

In step 310, the installer 111 receives parameters for a storage. For example, a user may enter parameters indicating how to connect to a distributed cloud storage. In other words, the storage parameters include information (e.g., IP address and possibly credentials (login/password)) for indicating how the server is to be connected to the cluster, i.e., to the distributed cloud storage 100.

In step 315, the installer 111 creates a virtual disk, e.g., the virtual disk 105, in a RAM and installs the OS 107 on the created virtual disk 105. The OS 107 is installed on the created virtual disk hosted on the distributed storage (rather than directly on a physical disk of the server; though as data of distributed storage is stored on disks of the server, it is possible that some of disks of the server will contain parts of data belonging to the virtual disk, i.e., parts of the OS image). It is noted that the OS image may contain only part of the files corresponding to the OS because some parts may already exist in the boot component. For example, an OS kernel may not be included in the OS image when the kernel already exists in the boot component. Moreover, the installation of the OS may be accomplished by placing the OS at a special place, and by placing the OS image in the storage when the node that includes the special place attempts to connect to the storage.

In step 320, the installer 111 connects to the storage in accordance with the received parameters of the storage and places the virtual disk (including the OS 107) at the storage. As described above, the virtual disk 105 may be a file of a loop back block device (or ploop-file), any other virtual disk, or a "raw" disk image. A utility for mounting the virtual disk 105 is needed. When the virtual disk is a "raw" image, it may be mounted directly using a "mount" command, i.e., no other utility is needed. When the virtual disk is a ploop-file, the initial root file system must have "ploop" driver inside. Thus, the boot component (e.g., initial root file system in it) must have a utility for mounting virtual disks.

In step 325, the installer 111 creates an initial root file system (e.g., in memory) able to: mount the storage and mount the virtual disk from the mounted storage to be used as a root partition.

In step 330, the installer 111 puts the boot component (including the kernel, OS loader and the initial root file system) on two or more physical block devices of the server. The number of physical block devices on which the boot component is placed may be predefined or may be computed during server configuration depending on characteristics of the server (e.g., number of disks, their sizes, estimated load, etc.). The server can be booted from any of the two or more of the physical block devices on which the boot component is put. As such, there is no single system disk. In other words, each physical block device of the two or more of the physical block devices on the server is now bootable. The installer 111 then proceeds to step 335 to end the process of installing the server.

As described above, the installer 111 places the virtual disk on which the OS is installed in a storage. This ensures that the OS image is available independently of the health of any specific disk of the server. In other words, for each server 101a, 101b, or 101n participating in a cluster, an OS image is stored in a storage and the image of the OS file system is distributed across the distributed cloud storage. The OS image is stored in a highly available storage system. That is, the distributed cloud storage 100 is highly available. Furthermore, the OS image is stored in a plurality of copies (e.g., three copies) and the stored image is always kept synchronized. As such, if the cluster is healthy, the OS image is available and the OS is guaranteed to be available. When an update is performed, in order to maintain consistency, only one OS image is updated and the other copies are synchronized to the updated copy.

Figure 4:
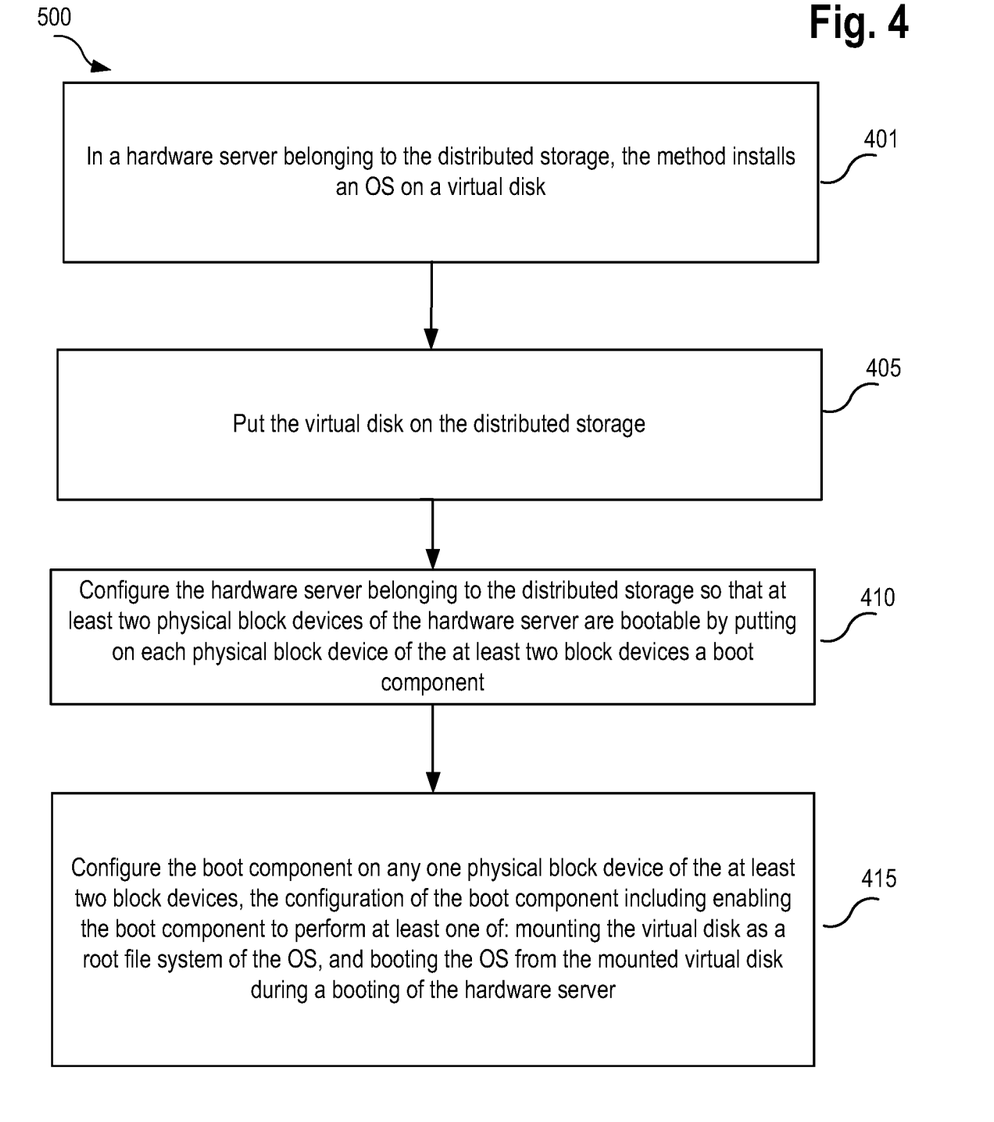
FIG. 4 illustrates a flowchart of a method for deploying servers in a distributed storage to improve fault tolerance in accordance with exemplary aspects of the present disclosure.

FIG. 4 illustrates a flowchart 400 of a method for deploying servers in a distributed cloud storage to improve fault tolerance in accordance with exemplary aspects of the present disclosure. The method of FIG. 4 may be carried out with the aid of the system described in FIGS. 1-3.

In step 401, the method, in a hardware server belonging to the distributed cloud storage, the method installs an OS on a virtual disk. The virtual disk comprises files belonging to the installed OS.

In step 405, the method puts the virtual disk on the distributed cloud storage.

In step 410, the method configures the hardware server belonging to the distributed cloud storage so that two or more of the physical block devices of the hardware server are bootable by putting, on each physical block device of the two or more of the physical block devices, a boot component.

In step 415, the method configures the boot component on any one physical block device of the two or more of the physical block devices, the configuration of the boot component including enabling the boot component to perform at least one of: mounting the virtual disk as a root file system of the OS (e.g., by mounting the virtual disk to the one physical block device of the hardware server), and booting the OS from the mounted virtual disk during a booting of the hardware server. The configuration of the boot component enables the boot component to connect to the distributed cloud storage and to access the virtual disk on the distributed cloud storage.

It is noted that the operations of method 400 for deploying servers in a distributed cloud storage to improve fault tolerance in accordance with exemplary aspects of the present disclosure may be performed in any order. As such, the steps described, in conjunction with the example in FIG. 4, are not intended to be limitations. Based on implementation and application, the steps of method 400 may be performed in any order.

FIG. 5 is a block diagram illustrating a computer system 20 on which aspects of systems and methods for deploying servers in a distributed storage to improve fault tolerance in accordance with an exemplary aspect or for booting servers in a distributed storage to improve fault tolerance in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for booting servers in a distributed storage to improve fault tolerance, comprising:
   during a booting of a hardware server belonging to the distributed storage, starting a boot component on any one physical block device from at least two or more physical block devices of the hardware server, wherein the at least two or more physical block devices of the hardware server are bootable and each physical block device of the at least two or more physical block devices stores the boot component and data of the distributed storage, wherein each physical block device of the at least two block devices contains a first part for storing the boot component and a second part for storing the data of the distributed storage in accordance to operations of the distributed storage, wherein an Operating System (OS) of the hardware server is installed on a virtual disk that is represented by a file, and wherein the virtual disk is stored on the distributed storage, wherein at least one replica of the file representing the virtual disk on which the OS is installed is stored on the hardware server, wherein the OS, as a part of the distributed storage, handles at least synchronization of replicas of the file representing the virtual disk; and
   by the boot component, accessing the distributed storage to obtain access to the virtual disk, mounting the virtual disk as a root file system of the OS, and booting the OS from the mounted virtual disk.

2. The method of claim 1, wherein the OS is responsible for an operation of the server as a part of the distributed storage.

3. The method of claim 1, wherein the OS is configured to perform at least one of: serving requests sent to the distributed storage, and running storage services including one of: metadata services, chunk services, data replication services and backup services.

4. The method of claim 1, wherein the OS, as a part of the distributed storage, handles tasks associated with the virtual disk on which the OS is installed.

5. The method of claim 1, wherein the virtual disk of the OS installed on the hardware server is stored on the distributed storage, and at least one replica of the virtual disk of the OS is stored on the hardware server.

6. The method of claim 1, wherein the boot component further performs at least one of: initializing hardware needed to start the OS, loading drivers needed to connect to the distributed storage and to work with the virtual disk, loading an image of the virtual disk of the OS from the distributed storage onto a Random Access Memory (RAM) or to a partition on any number of physical block devices, delegating control to the OS initialization process in a mounted image file.

7. The method of claim 1, wherein the boot component accesses the virtual disk on the distributed storage using an Internet Small Computer Systems Interface (iSCSI) storage networking standard.

8. The method of claim 1, wherein the virtual disk is a loop back block device or a raw disk image.

9. The method of claim 1, wherein the boot component comprises an OS kernel, an OS loader and an initial root file system bound to the OS kernel.

10. A system for booting servers in a distributed storage to improve fault tolerance, the system being implemented in a computing device comprising a processor, and any number of servers of the distributed storage, each server including at least one physical block device, at least two or more of the physical block devices of a hardware server being bootable, each physical block device of the at least two or more physical block devices storing a boot component and data of the distributed storage, each physical block device of the at least two block devices containing a first part for storing the boot component and a second part for storing the data of the distributed storage in accordance to operations of the distributed storage, an Operating System (OS) of the hardware server being installed on a virtual disk that is represented by a file, the virtual disk being stored on the distributed storage, wherein at least one replica of the file representing the virtual disk on which the OS is installed is stored on the hardware server, wherein the OS, as a part of the distributed storage, handles at least synchronization of replicas of the file representing the virtual disk, the processor configured to:
   during a booting of a hardware server belonging to the distributed storage, start a boot component on any one physical block device from at least two or more physical block devices of the hardware server; and
   by the boot component, access the distributed storage to obtain access to the virtual disk, mount the virtual disk as a root file system of the OS, and boot the OS from the mounted virtual disk.

11. The system of claim 10, wherein the OS is responsible for an operation of the server as a part of the distributed storage, and wherein the OS is configured to perform at least one of: serving requests sent to the distributed storage, and running storage services including one of: metadata services, chunk services, data replication services and backup services.

12. The system of claim 10, wherein the OS, as a part of the distributed storage, handles tasks associated with the virtual disk on which the OS is installed.

13. The system of claim 10, wherein the virtual disk of the OS installed on the hardware server is stored on the distributed storage, and at least one replica of the virtual disk of the OS is stored on the hardware server.

14. The system of claim 10, wherein the boot component further performs at least one of: initializing hardware needed to start the OS, loading drivers needed to connect to the distributed storage and to work with the virtual disk, loading an image of the virtual disk of the OS from the distributed storage onto a Random Access Memory (RAM) or to a partition on any number of physical block devices, delegating control to the OS initialization process in a mounted image file.

15. The system of claim 10, wherein the boot component accesses the virtual disk on the distributed storage using an Internet Small Computer Systems Interface (iSCSI) storage networking standard.

16. The system of claim 10, wherein the virtual disk is a loop back block device or a raw disk image.

17. The system of claim 10, wherein the boot component comprises an OS kernel, an OS loader and an initial root file system bound to the OS kernel.

18. A non-transitory computer readable medium storing thereon computer executable instructions for booting servers in a distributed storage to improve fault tolerance, including instructions for:

during a booting of a hardware server belonging to the distributed storage, starting a boot component on any one physical block device from at least two or more physical block devices of the hardware server, wherein the at least two or more physical block devices of the hardware server are bootable and each physical block device of the at least two or more physical block devices stores the boot component and data of the distributed storage, wherein each physical block device of the at least two block devices contains a first part for storing the boot component and a second part for storing the data of the distributed storage in accordance to operations of the distributed storage, wherein an Operating System (OS) of the hardware server is installed on a virtual disk that is represented by a file, and wherein the virtual disk is stored on the distributed storage, wherein at least one replica of the file representing the virtual disk on which the OS is installed is stored on the hardware server, wherein the OS, as a part of the distributed storage, handles at least synchronization of replicas of the file representing the virtual disk; and by the boot component, accessing the distributed storage to obtain access to the virtual disk, mounting the virtual disk as a root file system of the OS, and booting the OS from the mounted virtual disk.

19. The non-transitory computer readable medium of claim 18, wherein the OS is responsible for an operation of the server as a part of the distributed storage.

20. The non-transitory computer readable medium of claim 18, wherein the OS is configured to perform at least one of: serving requests sent to the distributed storage, and running storage services including one of: metadata services, chunk services, data replication services and backup services.

* * * * *